United States Patent
Salutzki et al.

(10) Patent No.: US 9,501,047 B2
(45) Date of Patent: Nov. 22, 2016

(54) SERVO DOOR-CLOSER

(71) Applicant: DORMA GMBH + CO. KG, Ennepetal (DE)

(72) Inventors: Thomas Salutzki, Witten (DE); Wolfgang Semelka, Witten (DE); Felix Böse, Ennepetal (DE)

(73) Assignee: DORMA DEUTSCHLAND GMBH, Ennepetal (DE)

( * ) Notice: Subject to any disclaimer, the term of this patent is extended or adjusted under 35 U.S.C. 154(b) by 97 days.

(21) Appl. No.: 14/358,848

(22) PCT Filed: Nov. 6, 2012

(86) PCT No.: PCT/EP2012/004609
§ 371 (c)(1),
(2) Date: May 16, 2014

(87) PCT Pub. No.: WO2013/072024
PCT Pub. Date: May 23, 2013

(65) Prior Publication Data
US 2014/0346997 A1 Nov. 27, 2014

(30) Foreign Application Priority Data

Nov. 18, 2011 (DE) .......... 10 2011 055 491

(51) Int. Cl.
| | |
|---|---|
| G05B 13/02 | (2006.01) |
| E05F 3/22 | (2006.01) |
| E05F 5/00 | (2006.01) |
| E05F 15/608 | (2015.01) |
| E05F 15/63 | (2015.01) |

(52) U.S. Cl.
CPC .............. *G05B 13/02* (2013.01); *E05F 3/224* (2013.01); *E05F 5/00* (2013.01); *E05F 15/608* (2015.01); *E05F 15/63* (2015.01); *E05Y 2201/412* (2013.01); *E05Y 2201/424* (2013.01); *E05Y 2201/426* (2013.01); *E05Y 2400/302* (2013.01); *E05Y 2400/31* (2013.01); *E05Y 2400/614* (2013.01); *E05Y 2900/132* (2013.01)

(58) Field of Classification Search
CPC ...................................... A61B 6/4482
USPC ........... 318/628, 2; 49/28, 32, 324, 139, 140
See application file for complete search history.

(56) References Cited

U.S. PATENT DOCUMENTS

| | | | | |
|---|---|---|---|---|
| 2,024,300 | A | * 12/1935 | Miller | ............ E05F 3/06 49/137 |
| 3,874,117 | A | * 4/1975 | Boehm | ............ E05F 15/63 318/442 |
| 5,417,011 | A | * 5/1995 | Keszthelyi | ............ E05F 15/53 49/28 |

(Continued)

FOREIGN PATENT DOCUMENTS

| | | |
|---|---|---|
| DE | 43 23 152 A1 | 1/1995 |
| WO | WO 2005/09577 A1 | 3/2005 |

*Primary Examiner* — Rita Leykin
(74) *Attorney, Agent, or Firm* — Cantor Colburn LLP

(57) ABSTRACT

A power-assisted door closer includes an output shaft, a driving mechanism operatively connected to the output shaft, a mechanical energy accumulator for storing closing energy for the door leaf and acting upon the driving mechanism, a motor/generator unit operatively connected to the output shaft and an electrical energy accumulator for storing an assisting energy for the door leaf and being electrically connected to the motor/generator unit.

16 Claims, 2 Drawing Sheets

(56) References Cited

U.S. PATENT DOCUMENTS

| | | | | |
|---|---|---|---|---|
| 7,571,515 B2* | 8/2009 | Fischbach | ............... | E05F 3/102 |
| | | | | 16/64 |
| 8,109,352 B2* | 2/2012 | Asbach | ................... | B62K 9/00 |
| | | | | 180/65.1 |
| 2006/0244271 A1* | 11/2006 | Hass | ....................... | E05F 15/70 |
| | | | | 292/336.3 |

* cited by examiner

SERVO DOOR-CLOSER

CROSS-REFERENCE TO RELATED APPLICATIONS

This is a U.S. national stage of application No. PCT/EP2012/004609, filed on 6 Nov. 2012, which claims priority to the German Application No. 10 2011 055 491.2, filed 18 Nov. 2011, the content of both incorporated herein by reference.

BACKGROUND OF THE INVENTION

1. Field of the Invention

The present invention relates to a power-assisted door closer for assisting in an opening or closing procedure of a door.

2. Related Art

Door closers known in the state-of-the-art include an output shaft which can be driven by a driving mechanism. The output shaft is, for example, connected to a door leaf by a scissor arm assembly or a sliding rail arm assembly. Furthermore, a closer spring acts upon the driving mechanism. By manually opening the door leaf, the output shaft is entrained into rotation. The closer spring is tensioned by the driving mechanism and thus stores the energy for the closing procedure. The closing procedure of the door leaf occurs without any manual intervention by the user. In this case, it is by means of the driving mechanism that the energy of the closer spring acts upon the output shaft and thus upon the door leaf. In particular in case of very heavy and large door leaves, assistance for tensioning the closer spring during the opening procedure and/or a dampening action of the door in the terminal position is required. For the door leaf to reliably latch into the latching mechanism, a sufficient closing moment is required in the area of the zero position of the door.

SUMMARY OF THE INVENTION

It is an object of the present invention to provide a power-assisted door closer, which, while being inexpensive in manufacturing, mounting and maintenance, allows for a reliable and user-friendly assisted opening and/or closing procedure of the door.

The problem is thus solved, in accordance with on aspect of the present invention, by a power-assisted door closer comprising an output shaft. The output shaft is configured for transferring forces onto an arm assembly or for directly transferring forces onto a door leaf. A scissor arm assembly or a sliding rail arm assembly serves for example as the assembly. If the power-assisted door closer is directly attached to the door leaf the forces are transferred to a fixed point, for example a wall or a casing, via the output shaft and the arm assembly. If the power-assisted door closer is attached to the wall or to the casing, the forces are transferred onto the door leaf via the output shaft and the arm assembly. As an alternative, the power-assisted door closer, configured for example as a floor door closer, may directly transfer the forces from the output shaft onto the pivoting axis of the door leaf. Furthermore, the inventive power-assisted door closer comprises a driving mechanism which is operatively connected to the output shaft and a mechanical energy accumulator for acting upon the driving mechanism, which energy accumulator serves for storing a closing energy for the door leaf. The mechanical energy accumulator is loaded, respectively tensioned during a manual opening procedure of the door leaf, and is unloaded for closing the door leaf. Furthermore, the power-assisted door closer comprises a motor/generator unit, which is operatively connected to the output shaft and an electrical energy accumulator for storing an assisting energy for the door leaf, which energy accumulator is electrically connected to the motor/generator unit. Simultaneously with the opening and the closing procedures of the door leaf, the output shaft always rotates and consequently likewise the armature shaft of the motor/generator unit which is operatively connected to the output shaft. Depending on its actuation, the motor/generator unit now serves for charging the electrical energy accumulator or for assisting in driving the output shaft. The motor/generator unit is in particular bi-directionally and mechanically operatively connected, respectively coupled to the output shaft. In other words, upon rotation of the output shaft, namely during an opening and closing procedure of the door, the armature shaft of the motor/generator unit always rotates as well.

It is in particular preferably provided that the mechanical energy accumulator comprises a closer spring. The closer spring consists in particular of a helical spring. Preferably, the driving mechanism comprises a toothed rack, which is in engagement with a toothed wheel at the output shaft. As an alternative, a cam disc may be disposed on the output shaft. In this case, the driving mechanism comprises a pressure roller, which rolls on the cam disc. The closer spring acts either upon the toothed rack or upon the pressure roller, such that, by rotating the output shaft, a linear movement of the closer spring is generated either by the toothed rack or by the pressure roller.

It is furthermore preferably provided, that the electrical energy accumulator comprises at least one accumulator and/or at least one capacitor. In particular the power-assisted door closer does not have a connection to a power supply. For assisting the opening and/or closing procedures of the door, exclusively the energy of the electrical energy accumulator is utilized.

In a preferred embodiment, it is provided, that the motor/generator unit is configured to assist in a manual opening of the door leaf and simultaneously assist in a tensioning of the mechanical energy accumulator. It is furthermore preferably provided that a closing of the door leaf performed by unloading the mechanical energy accumulator is assisted or dampened by the motor/generator unit. A tensioning of the mechanical energy accumulator occurs during the opening procedure. For this purpose, a certain expenditure of forces is required by the user of the door. In order to reduce this expenditure of forces, the opening procedure is assisted by the motor/generator unit and by the energy stored in the electrical energy accumulator. Closing the door is realized by unloading the mechanical energy accumulator. In this case, the motor/generator unit and the energy stored in the electrical energy accumulator can be utilized both to reinforce the mechanical energy accumulator while providing electrical energy and to dampen the closing procedure of the door while receiving electrical energy.

Preferably, the motor/generator unit is configured to function as a generator for charging the electrical energy accumulator upon opening and/or closing the door leaf. In particular during the partial closing procedure, a portion of the mechanical energy from the mechanical energy accumulator can be transformed by the motor/generator unit into electrical energy. In this case, the motor/generator unit simultaneously functions as a generator for charging the electrical energy accumulator and for dampening the closing procedure of the door.

In a particularly preferred embodiment, the motor/generator unit is utilized for reducing the opening momentum in the beginning of the opening procedure of the door closer. Depending on the configuration of the driving mechanism and of the utilized arm assembly, the required opening momentum may be very high with small door angles. In particular in this range, an assistance of the opening procedure by the motor/generator unit is beneficial. For this purpose, it is preferably intended that the motor/generator unit be configured to assist a manual opening of the door leaf only in an angular range between 0 and 45°, in particular between 0 and 30°, in particular only between 0 and 25°. It is intentionally provided that only a partial range of the opening procedure is assisted, such that the dimensions of the motor/generator unit and of the electrical energy accumulator do not have to be too large and that sufficient electrical energy is always available.

Upon manually opening the door leaf, in particular heavy doors need to be dampened in the terminal range, such that for example an impact of the door leaf against the wall or excessive overload of the hinges is avoided. For this purpose, it is intended that the motor/generator unit is configured to function as a generator for dampening a manual opening of the door leaf in an angular door range of up to 30° before the terminal position of the door, in particular of up to 20° before the terminal position of the door, in particular of up to 15° before the terminal position of the door.

There are two preferred possibilities for utilizing the motor/generator unit during the closing procedure. On the one hand, it may be desirable to assist the mechanical closing at small angular ranges, such that the door reliably latches in the latching mechanism. On the other hand, there are application areas in which dampening the door closing is required, in particular at small angular ranges of the door. For this purpose it is preferably provided that the motor/generator unit is configured to assist or to function as a generator for dampening a closing procedure of the door leaf only in an angular range between 0 and 45°, in particular only between 0 and 30°, in particular between 0 and 25°.

Assisting the opening or the closing procedure by the motor/generator unit is always performed while releasing electrical energy from the electrical energy accumulator.

Furthermore, it is preferably provided that a control unit actuates the motor/generator unit. The control unit may be acting for both controlling and regulating the motor/generator unit. Furthermore, it is preferred that a position sensor be affixed to the motor/generator unit, which directly senses the rotation angle of the motor/generator unit, in particular directly at the armature shaft. As an alternative, the position sensor may be likewise disposed at the output shaft. Moreover, the control unit is configured to detect the direction of rotation of the door leaf based on the current and/or the voltage at the motor/generator unit. Based on the rotation angle data of the position sensor and the direction of rotation, the control of the motor/generator unit and thus the assistance or the dampening of the door leaf movement is controlled as needed.

BRIEF DESCRIPTION OF THE DRAWINGS

The invention will now be described in more detail, reference being made to the drawings, in which.

DETAILED DESCRIPTION OF THE PRESENTLY PREFERRED EMBODIMENTS

Figure 1:
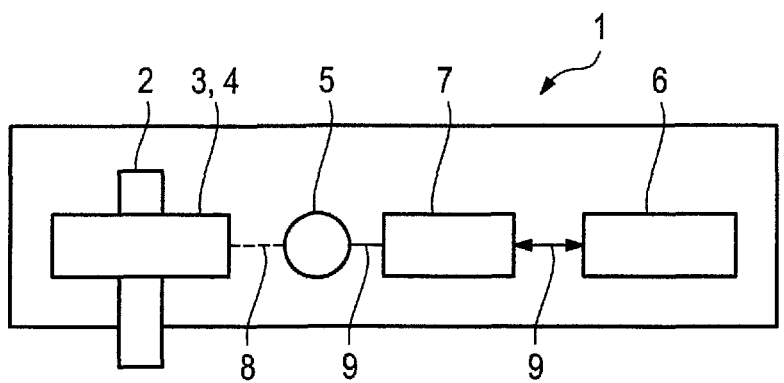
FIG. 1 shows the diagrammatical structure of an inventive power-assisted door closer according to an exemplary embodiment.

FIG. 1 shows the diagrammatical structure of the power-assisted door closer 1. The power-assisted door closer 1 comprises an output shaft 2, a driving mechanism 3, a mechanical energy accumulator 4, configured as a closer spring, a motor/generator unit 5, a control unit 7 and an electrical energy accumulator 6, configured as an accumulator or as a capacitor.

The output shaft 2 is entrained into rotation via the driving mechanism 3. The door or a scissor arm assembly or a sliding rail arm assembly are, for example directly, mounted to said output shaft 2. The driving mechanism 3 transforms the rotational movement of the output shaft 2 into a linear movement. The linear movement is used to transfer forces onto the closer spring 4. The closer spring 4 relaxes during the closing procedure of the door. In this case, the driving mechanism 3 transforms the linear movement of the closer spring 4 into a rotating movement of the output shaft 2.

The motor/generator unit 5 is connected to the output shaft 2 via the mechanical operative connection 8. The mechanical operative connection 8, respectively the coupling is bi-directional such that during rotation of the output shaft 2, the armature shaft of the motor/generator unit 5 always rotates and vice versa. The motor/generator unit 5 is electrically connected to the electrical energy accumulator 6 via a control unit 7 (see FIG. 4). Therefore, by the motor/generator unit 5, the electrical energy accumulator 6 can be charged, respectively the motor/generator unit 6 can be operated as a motor by the electrical energy accumulator 6. For this purpose, electrical connections 9 are provided between the motor/generator unit 5, the control unit 7 and the electrical energy accumulator 6.

Figure 2:
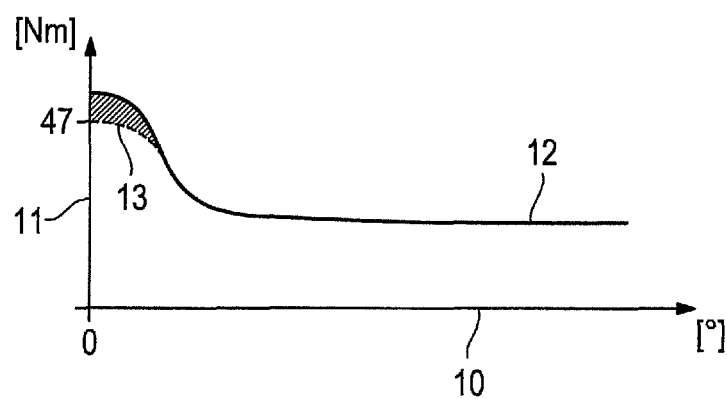
FIG. 2 shows a characteristic of the opening momentum, when utilizing the inventive power-assisted door closer according to the exemplary embodiment.

FIG. 2 shows the characteristic of an opening momentum at the output shaft 2 during the opening procedure of a door leaf. The door leaf opening angle is illustrated on the X-axis 10. The opening momentum is illustrated on the Y-axis 11. The solid line shows an opening momentum 12 without the assistance of the motor/generator unit 5. The dashed line shows an opening 13 assisted by the motor/generator unit 5 in the range of small door angles, i.e., in the range of an initial opening of the door. According to the invention, a relatively light driving mechanism 3 can be used, wherein, on account of the additional use of the motor/generator unit 5 and the electrical energy accumulator 6, the opening momentum can be reduced to preferably 47 Nm. The opening momentum of 47 Nm is defined by the DIN-standard 18040 for certain doors assigned to a barrier-free access.

Figure 3:
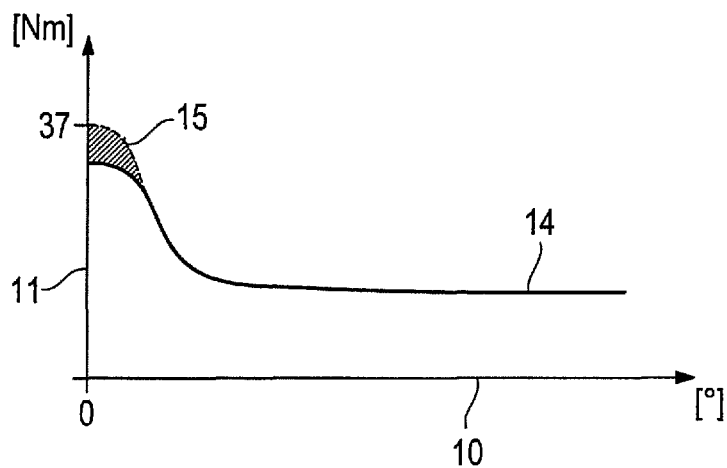
FIG. 3 shows a characteristic of the closing momentum, when utilizing the inventive power-assisted door closer according to the exemplary embodiment.

FIG. 3 shows the characteristic of a closing momentum at the output shaft 2. In this case, the door angle is again illustrated on the X-axis 10. The Y-axis 11 shows the closing momentum. The solid line shows a closing momentum 14 without the assistance of the motor/generator unit 5. The dashed line shows a closing 15 assisted by means of the motor/generator unit. In this case, according to the invention a relatively light closer mechanism is assisted by the motor/generator unit 5 and the electrical energy accumulator 6 in such a way that the closing momentum can be increased to 37 Nm. The 37 Nm closing momentum is required for certain doors for fire safety reasons and are predetermined by the DIN-standard 1154.

As an alternative or in addition for reducing the opening momentum according to FIG. 2 or for increasing the closing momentum according to FIG. 3, it is likewise possible to increase for example the opening momentum in the range of large door angles with the motor/generator unit 5 such that a dampening in the terminal opening position is realized. The motor/generator unit 5 can be likewise operated as a generator during the closing procedure and thus provide a closing dampening.

Figure 4:
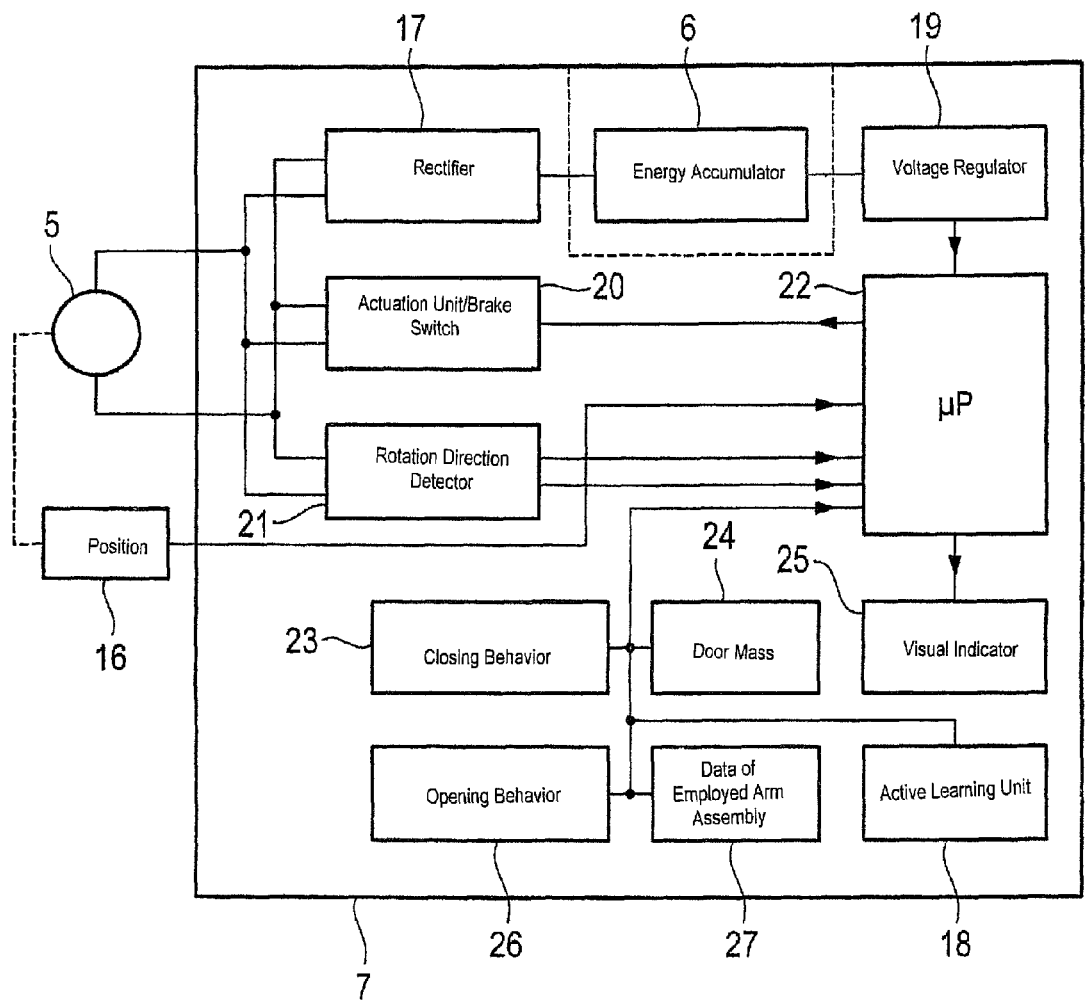
FIG. 4 shows a diagrammatical structure of a control unit of the inventive power-assisted door closer according to the exemplary embodiment.

FIG. 4 shows a diagrammatical illustration of the control unit 7 of the power-assisted door closer 1 according to the exemplary embodiment. The control unit 7 is connected to the motor/generator unit 5. A position sensor 16, which is likewise connected to the control unit 7, is located at the motor/generator unit 5. Furthermore, the control unit 7 is connected to the energy accumulator 6.

The control unit 7 comprises a rectifier 17 connected to the motor/generator unit 5. The rectifier 17 in turn is connected to the energy accumulator 6. Moreover, the control unit 7 comprises a voltage regulator 19 for supplying the control unit 7, in particular a processor 22 with energy from the energy accumulator 6. The processor 22 of the control unit 7 receives data on the current angle of rotation of the door leaf from the position sensor 16. Based on current or voltage at the motor/generator unit 5, a rotation direction detection unit 21 senses the direction of rotation of the motor/generator unit 5 and supplies the data likewise to the processor 22. Further input data for the processor 22 are the desired closing behaviour 23, the desired opening behaviour 26, the door mass 24 as well as the data of the employed arm assembly 27 and an algorithm for active learning 18. The processor 22 controls the motor/generator unit 5 via an actuation/brake switching unit 20 of the motor/generator unit 5. Furthermore, a visual indicator 25 is provided at the control unit 7 for displaying different modes of operation of the power-assisted door closer 1.

Depending on the direction of rotation of the door leaf and depending on the angle of the door, it is possible to actuate the motor/generator unit 5 by means of the control unit 7 in such a way that it functions either as a generator or as a motor.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A power-assisted door closer (1), comprising:
an output shaft (2);
a driving mechanism (3) operatively connected to the output shaft (2);
a mechanical energy accumulator configured to store a closing energy for a door leaf and act upon the driving mechanism (3);
a motor/generator unit (5) mechanically and directly operatively connected to the output shaft (2); and
an electrical energy accumulator (6) configured to store assisting energy for the door leaf, the electrical energy accumulator (6) being electrically connected to the motor/generator unit (5),
wherein the motor/generator unit (5) is configured to assist a manual opening of the door leaf only up to an angular door range between 0 and 45°.

2. The power-assisted door closer according to claim 1, wherein the mechanical energy accumulator (4) comprises a closer spring.

3. The power-assisted door closer according to claim 1, wherein the electrical energy accumulator (6) comprises an accumulator and/or a capacitor.

4. The power-assisted door closer according to claim 1, wherein the motor/generator unit (5) is configured to assist a manual opening of the door leaf and a simultaneous tensioning of the mechanical energy accumulator (4), and/or to assist or to dampen a closing of the door leaf performed by a discharge of the mechanical energy accumulator (4).

5. The power-assisted door closer according to claim 1, wherein the motor/generator unit (5) is configured to act as a generator for charging the electrical energy accumulator (6) during opening and/or closing of the door leaf.

6. The power-assisted door closer according to claim 1, wherein the motor/generator unit (5) is configured to dampen, while functioning as a generator, a manual opening of the door leaf in the angular door range of up to 30° before the terminal position of the door.

7. The power-assisted door closer according to claim 1, wherein the motor/generator unit (5) is configured to assist or to dampen, while functioning as a generator, a closing of the door leaf only in the angular door range between 0° and 45°.

8. The power-assisted door closer according to claim 1, further comprising a position sensor (16) configured to detect an angle of door rotation directly at the motor/generator unit (5).

9. The power-assisted door closer according to claim 1, further comprising a control unit (7) actuating the motor/generator unit (5), the control unit (7) being configured to detect the direction of rotation of the door leaf based on the current and/or the voltage at the motor/generator unit (5).

10. The power-assisted door closer according to claim 1, wherein the motor/generator unit (5) is configured to assist a manual opening of the door leaf only between 0 and 30°.

11. The power-assisted door closer according to claim 1, wherein the motor/generator unit (5) is configured to assist a manual opening of the door leaf only between 0 and 25°.

12. The power-assisted door closer according to claim 6, wherein the motor/generator unit (5) is configured to dampen, while functioning as a generator, a manual opening of the door leaf in the angular door range of up to 20° before the terminal position of the door.

13. The power-assisted door closer according to claim 6, wherein the motor/generator unit (5) is configured to dampen, while functioning as a generator, a manual opening of the door leaf in the angular door range of up to 15° before the terminal position of the door.

14. The power-assisted door closer according to claim 7, wherein the motor/generator unit (5) is configured to assist or to dampen, while functioning as a generator, a closing of the door leaf only in the angular door range between 0° and 30°.

15. The power-assisted door closer according to claim 7, wherein the motor/generator unit (5) is configured to assist or to dampen, while functioning as a generator, a closing of the door leaf only in the angular door range between 0° and 25°.

16. The power-assisted door closer according to claim 1, wherein the operative connection of the motor/generator unit (5) to the output shaft is bi-directional.

\* \* \* \* \*